(12) United States Patent
Poppe et al.

(10) Patent No.: US 7,546,984 B2
(45) Date of Patent: Jun. 16, 2009

(54) FLAP INTERCONNECTION SYSTEM FOR AIRCRAFT

(75) Inventors: Bernd Poppe, Bremen (DE); Kurt Auhagen, Bremen (DE)

(73) Assignee: Airbus Deutschland GmbH, Hamburg (DE)

(*) Notice: Subject to any disclaimer, the term of this patent is extended or adjusted under 35 U.S.C. 154(b) by 469 days.

(21) Appl. No.: 11/187,334

(22) Filed: Jul. 22, 2005

(65) Prior Publication Data

US 2006/0022093 A1 Feb. 2, 2006

(30) Foreign Application Priority Data

Jul. 23, 2004 (DE) .................. 10 2004 035 921

(51) Int. Cl.
*B64C 9/02* (2006.01)
(52) U.S. Cl. .................. 244/215; 244/217; 244/131
(58) Field of Classification Search .......... 244/213, 244/215, 214, 216, 217, 129.1, 131, 133, 244/75 R
See application file for complete search history.

(56) References Cited

U.S. PATENT DOCUMENTS

| | | | | |
|---|---|---|---|---|
| 3,655,149 A | * | 4/1972 | Williams | 244/225 |
| 3,706,431 A | * | 12/1972 | Smith | 244/216 |
| 3,986,689 A | * | 10/1976 | Maltby | 244/213 |
| 4,213,587 A | | 7/1980 | Roeseler et al. | |
| 4,305,177 A | | 12/1981 | Feifel | |
| 4,471,925 A | | 9/1984 | Kunz | |
| 4,494,716 A | * | 1/1985 | Breedveld et al. | 244/213 |
| 4,715,567 A | | 12/1987 | Poccard | |
| 5,628,477 A | * | 5/1997 | Caferro et al. | 244/214 |
| 5,845,877 A | | 12/1998 | Justice et al. | |
| 6,464,176 B2 | * | 10/2002 | Uchida et al. | 244/216 |
| 6,930,489 B2 | * | 8/2005 | Schievelbusch et al. | 324/503 |
| 7,293,744 B2 | * | 11/2007 | Perez-Sanchez et al. | 244/211 |
| 2007/0034748 A1 | * | 2/2007 | Sakurai et al. | 244/215 |

FOREIGN PATENT DOCUMENTS

| | | |
|---|---|---|
| DE | 35 05 839 | 11/1989 |
| DE | 91 13 095.5 U1 | 1/1992 |

* cited by examiner

*Primary Examiner*—Michael Carone
*Assistant Examiner*—Benjamin P Lee
(74) *Attorney, Agent, or Firm*—Christopher Paradies; Fowler White Boggs P.A.

(57) ABSTRACT

Described is an interconnection system, in particular for flaps which are located side-by-side, on an aircraft wing, for example landing flaps or high-lift flaps. The interconnection system is in particular characterised in that it comprises a correspondingly guided compensating profile for a gap between the flaps, which gap changes when the flaps are moved. Preferably, the interconnection system is combined with a failsafe device for adjacent flaps in the form of a longitudinally adjustable interconnection strut which is connected to the adjacent flaps by way of corresponding load introduction fittings. The interconnection system is in particular suitable for large aircraft in which the gap between adjacent flaps, due to the relatively large lateral movement of the flaps during retraction and extension, becomes relatively wide, and the forces acting on the flaps are relatively great.

8 Claims, 8 Drawing Sheets

FLAP INTERCONNECTION SYSTEM FOR AIRCRAFT

RELATED APPLICATIONS

This application claims the benefit of the filing date of German Patent Application No. 10 2004 035 921.0 filed Jul. 23, 2004 to Poppe, et al., the disclosure of which is hereby incorporated herein by reference.

FIELD OF THE INVENTION

The field relates to aircraft flaps, for example, landing flaps or high-lift flaps, which are located side-by-side on the wing of an aircraft.

BACKGROUND

Generally speaking, flaps of this type are allocated to a separate drive system which can be activated by way of a common shaft, with which each of the flaps is driven or guided individually. To prevent uncontrolled movement of the respective flap in the case of a failure or fault in one of the drive systems, adjacent flaps are in each case interconnected by way of an interconnection system.

Such an interconnection system which is used as a failsafe device (in horizontal direction of flight) is for example disclosed in DE 35 05 839 C2. In this system adjacent flaps are coupled to each other by way of an interconnection strut designed in the form of a piston-cylinder arrangement, with the longitudinal adjustment of said interconnection strut being limited by two end stops. If the interconnection strut reaches an end stop, forces (or loads) can be transmitted. The interconnection strut thus only permits limited deviation of the relative movements of the flaps attached to it. Before an end stop is reached, a switch is activated in order to signal failure of one of the drive systems or guide systems when one of the end stops has been reached.

It is believed that, this interconnection system is associated with a disadvantage in that it is only suitable for horizontal interconnection of flap systems.

SUMMARY OF THE INVENTION

For flap systems of newer aircraft, in particular large aircraft, an interconnection system that is only suitable for horizontal interconnection of flap systems may be inadequate. A flap system of the present invention is designed in combination with other innovative measures, which implement vertical interconnection of the flap system. Relatively large forces in the vertical direction that are associated with the increasingly large dimensions of flaps such as landing flaps require vertical interconnection of the flap system to ensure safety.

One advantage of implementing vertical interconnection is that forces that would exceed the load ratings of known interconnection systems may be adequately supported by a flap system having the vertical interconnection. Another advantage of a flap system according to the present invention is that the increasingly large lateral movements of adjacent flaps are accommodated by the flap system. The previously known systems are not able to bridge the maximum gap widths between adjacent flaps of new, larger designs. Specifically, the maximum gap widths of new, larger designs are often too large to be able to be bridged by known interconnection and sealing systems.

A further obstacle to the application of previously known interconnection systems is of the thickness of the landing flaps, i.e. their design height, due to the very slim flap batten (Klappenstrak), being considerably smaller in relation to the flap depth, so that at least in height there is considerably less space available for the interconnection systems. Another advantage of an interconnection system according to the present invention is that the interconnection system may be suitable for transferring significantly greater forces between adjacent flaps, even with very slim flap battens, than has been the case in known interconnection systems.

In another advantageous embodiment, it may be desirable to provide an interconnection system that is capable of following significantly greater lateral relative movements between adjacent flaps than is the case with known interconnection systems. Also, it may be desirable to provide an interconnection system that also works in vertical direction, wherein the design height of said interconnection system is considerably lower than the design height of known interconnection systems so that it is also suitable for interconnecting flaps of relatively low height.

According to an exemplary embodiment an interconnection system for adjacent flaps of an aircraft is provided, with a compensating profile for a gap between the flaps, which gap changes as the flaps are moved, wherein the interconnection system comprises a first coupling with which the compensating profile is guided on one of the flaps.

According to a further exemplary embodiment, with a second coupling, a guidance of the compensating profile between the flaps may be optimised.

According to a further exemplary embodiment, a failsafe device for interconnecting adjacent flaps may be provided.

BRIEF DESCRIPTION OF THE DRAWINGS

The drawings show examples of the present invention, which is not limited to the specific examples as represented in the drawings.

Further details, characteristics and advantages of examples of the invention have been provided in the following description with reference to the drawings. The following are shown.

DETAILED DESCRIPTION OF PREFERRED EMBODIMENTS OF THE INVENTION

This detailed description and the drawings provide specific examples of the invention, but the invention should not be limited merely to the examples disclosed. Instead, the invention should be limited only by the claims that may eventually issue. Many variations in the system, changes in specific components of the system and uses of the system will be readily apparent to those familiar with the field based on the drawings and description provided.

Figures 1, 2:
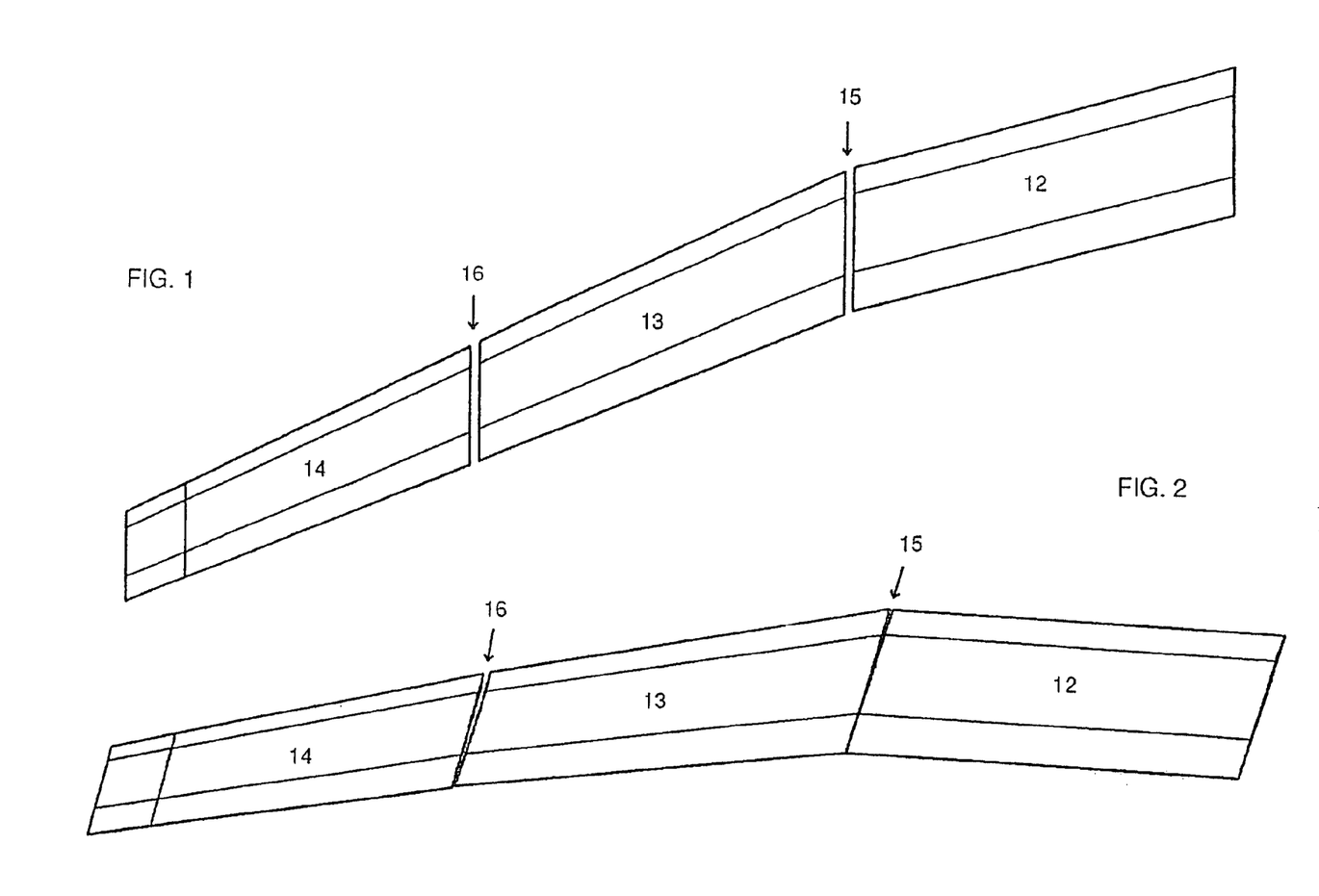
FIG. 1 shows landing flaps of an aircraft wing in their retracted positions in accordance with an exemplary embodiment of the present invention.
FIG. 2 shows the landing flaps of FIG. 1 in their extended positions in accordance with an exemplary embodiment of the present invention.

FIGS. 1 and 2 show three landing flaps 12, 13, 14 which extend side-by-side along an aircraft wing, generally speaking in the trailing edge region of said wing. In this arrangement, the first landing flap 13 is located on the side facing the fuselage, while the second and third landing flaps 13, 14 are adjacent in the direction of the wing tip.

FIG. 1 shows the relative position of these three landing flaps in their retracted positions (0 degree flap setting), while FIG. 2 shows their relative positions when they are extended. Generally speaking, movement of the landing flaps is by way of rotary drives, wherein each landing flap is associated with a drive (not shown) of its own. As shown in the drawing, there is a considerable difference in the width and alignment of the gaps 15, 16 between the second and the third landing flap as well as between the third and the fourth landing flap in their retracted and extended positions. Due to the lateral relative movements of adjacent flaps, the gaps 15, 16 not only become narrower as the flaps are extended, but they also assume a more or less pronounced V-shape.

On the one hand, the flap interconnection system according to the invention, which is arranged between respective adjacent landing flaps 12, 13; 13, 15, is used for interconnecting the landing flaps in the case where one of the drives in connection with an interconnection strut fails, and is in particular designed in such a way that it can also transfer the relatively large forces that act on the flaps in large aircraft.

On the other hand, the flap interconnection system is used for creating profile compensation, by means of which in particular in the retracted position the relatively large width of the gaps 15, 16 can be bridged, i.e. can be largely closed aerodynamically.

Figure 3:
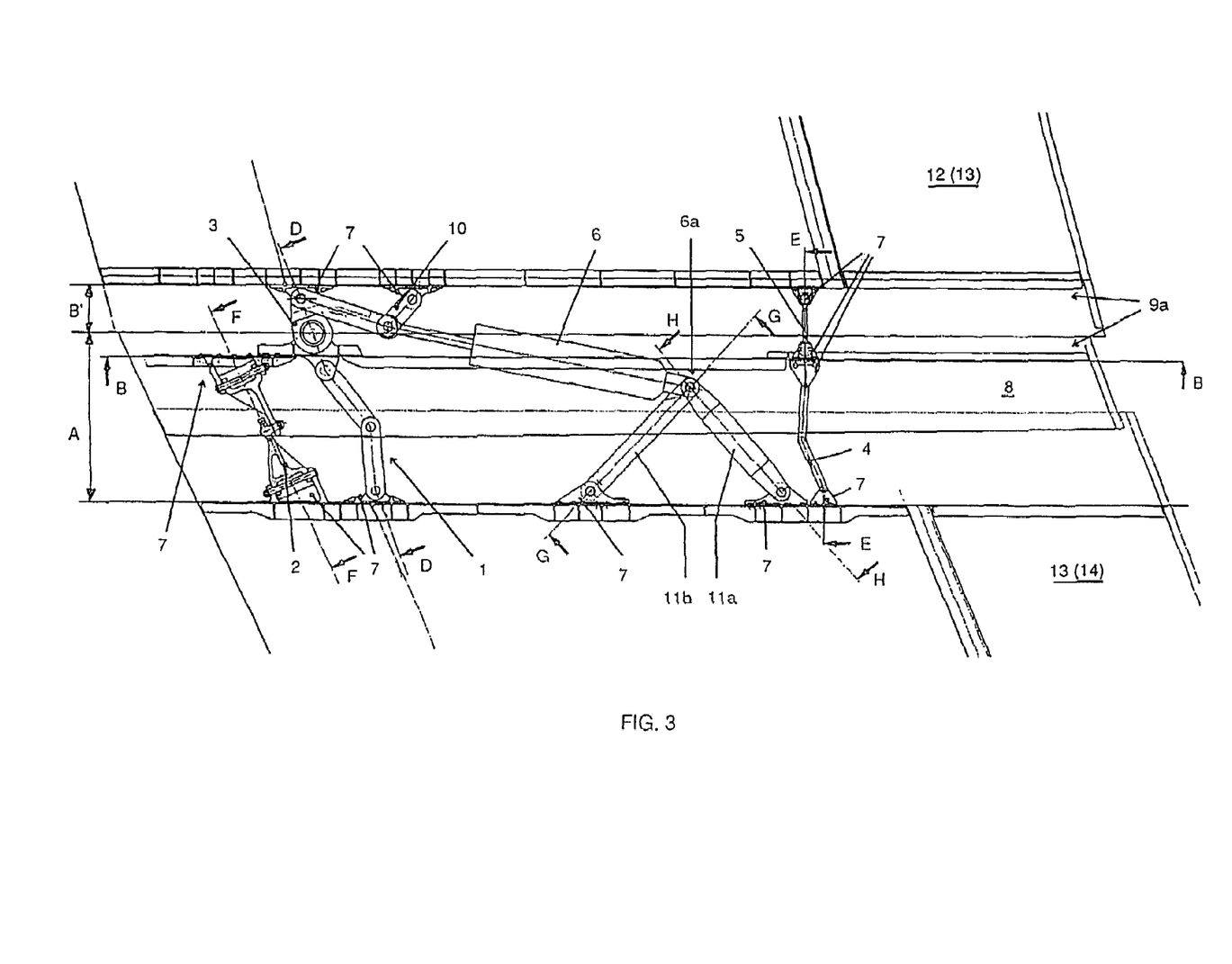
FIG. 3 shows a top view of an interconnection system in accordance with an exemplary embodiment of the present invention, in a position with a large flap space.
Figure 4:
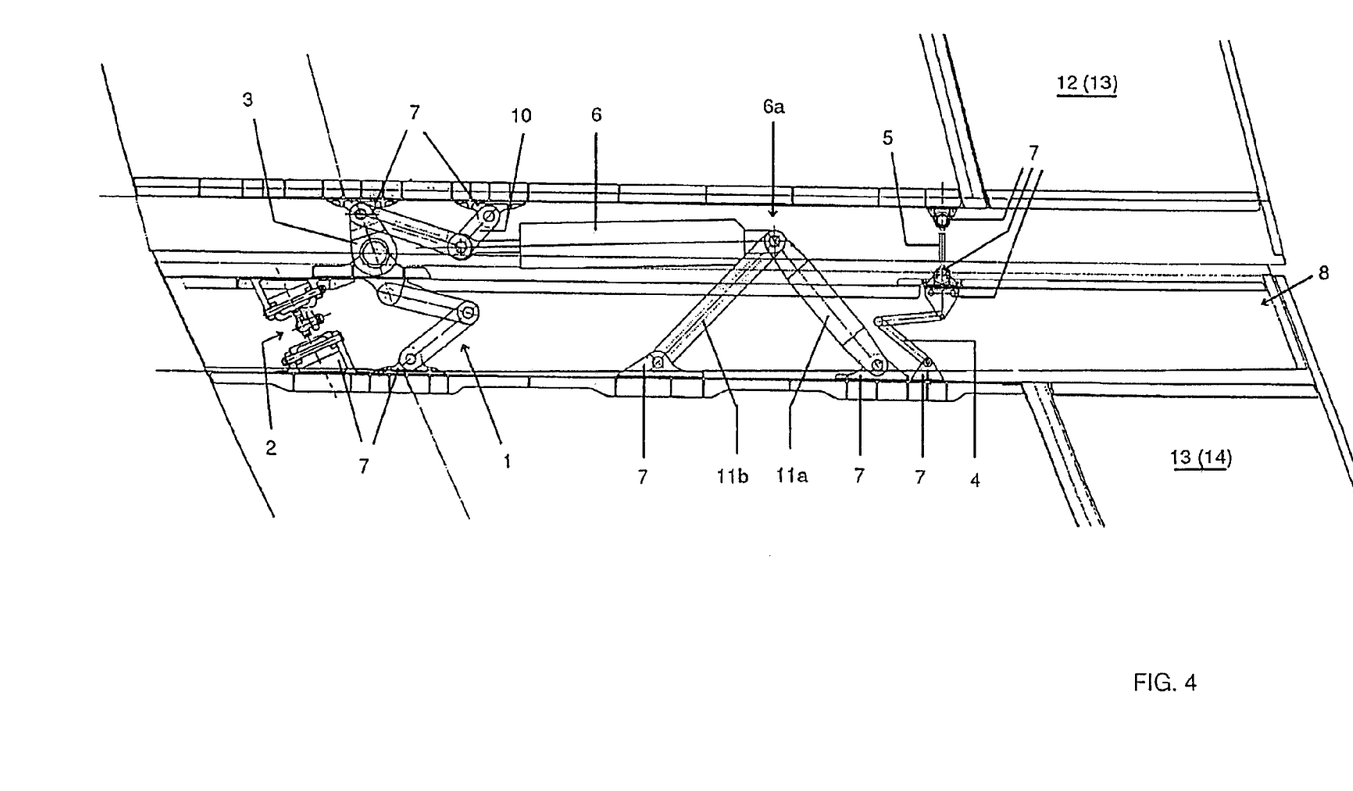
FIG. 4 shows the interconnection system according to FIG. 3, in a position with a small flap space.

FIGS. 3 and 4 diagrammatically show top views of a flap interconnection system according to the invention, which flap interconnection system can be mounted between the first and the second landing flaps 12, 13 and if need be between the second and the third landing flaps 13, 14. In FIG. 3 the landing flaps are in their retracted positions, shown in FIG. 1, with relatively large flap spacing and consequently relatively large width of the gaps 15, 16, while FIG. 4 shows their extended positions according to FIG. 2 with a small flap space and narrow gaps 15, 16.

The interconnection system comprises a longitudinally adjustable interconnection strut 6 in the form of a piston-cylinder arrangement, by means of which interconnection strut 6 adjacent landing flaps 12, 13; 13, 14 are interconnected to provide a failsafe device.

For this purpose two first load introduction fittings 10 are arranged on the first landing flap 12 by means of two fittings 7, wherein one end of the interconnection strut 6 is coupled to said load introduction fittings 10, at their connection point. Furthermore, two second load introduction fittings 11a, 11b are connected to the second landing flap 13 by means of two fittings 7, wherein the connection point of said load introduction fittings 11a, 11b is coupled to the other end of the interconnection strut 6.

If one of the flap drives fails, the interconnection strut 6 accepts the task of a second load path, thus preventing jamming or uncontrolled movement of the respective landing flap.

The interconnection system further comprises a compensation profile 8 in the form of a movable profile rib by means of which the gap 15 (or 16) between the first and the second landing flaps 12, 13 (or between the second and the third landing flaps 13, 14) in their retracted state, i.e. when the gap is wide, is at least largely bridged and/or aerodynamically closed.

For the purpose of guiding and affixing the compensating profile 8, at its region located at the leading edge of the wing (i.e. the front region), a longitudinally adjustable two-part guide arm 2 for force transmission is provided, which two-part guide arm 2 at one side is attached by way of a fitting 7 to the compensating profile 8, and at the other side is attached to the second landing flap 13 by way of a fitting 7.

On the opposing rear region of the compensating profile 8 there is a first longitudinally adjustable two-part steering arm 4 which by means of fittings 7 is coupled to the compensating profile 8 and to the second landing flap 13.

Between the guide arm 2 and the first steering arm 4 in the front region of the compensating profile 8 there is a second longitudinally adjustable two-part steering arm 1, which again, by means of fittings 7 on each side, is coupled to the compensating profile 8 and to the second landing flap 13.

Furthermore, on the front region of the compensating profile 8 a spherical-head fitting (spherical-head attachment) 3 is attached, which is connected to the first landing flap 12 by way of a fitting 7.

Finally, in the rear region of the compensating profile 8 there is a steering or control rod 5, which at one end is coupled to the first landing flap 12 by way of a fitting 7, and at the other end is hinged to the compensating profile 8 by way of a fitting 7.

In FIG. 3, arrows 9a finally indicate the locations of tubular seals for aerodynamic sealing of the transition between the slidable compensation profile 8 and the adjacent landing flaps 12, 13.

To explain the function, the interconnection system is preferably divided into two regions A' and B' between the adjacent landing flaps 12 and 13.

In region A' landing flap profile compensation takes place. The compensating profile 8 is interconnected both to the second landing flap 13 by way of the arms 1, 2 and 4, and to the first landing flap 12 by way of the spherical-head attachment 3, and the steering rod 5. Lateral guidance of the compensating profile 8 takes place by way of the arms 1, 2, and 4 in such a way that if the flap spacing is large, the compensating profile 8 between the landing flaps 12, 13 is extended. This becomes clear in particular in a comparison of FIGS. 3 and 4.

In region B', movement compensation between the landing flap 12 and the compensating profile 8 takes place by way of the spherical-head attachment 3 in the front region of the interconnection system, and by way of the steering rod 5 in the rear region of the interconnection system The forces which occur on the landing flaps as a result of deformation are transferred between the adjacent landing flaps by way of the spherical-head attachment 3 and the second steering arm 1.

Figure 5:
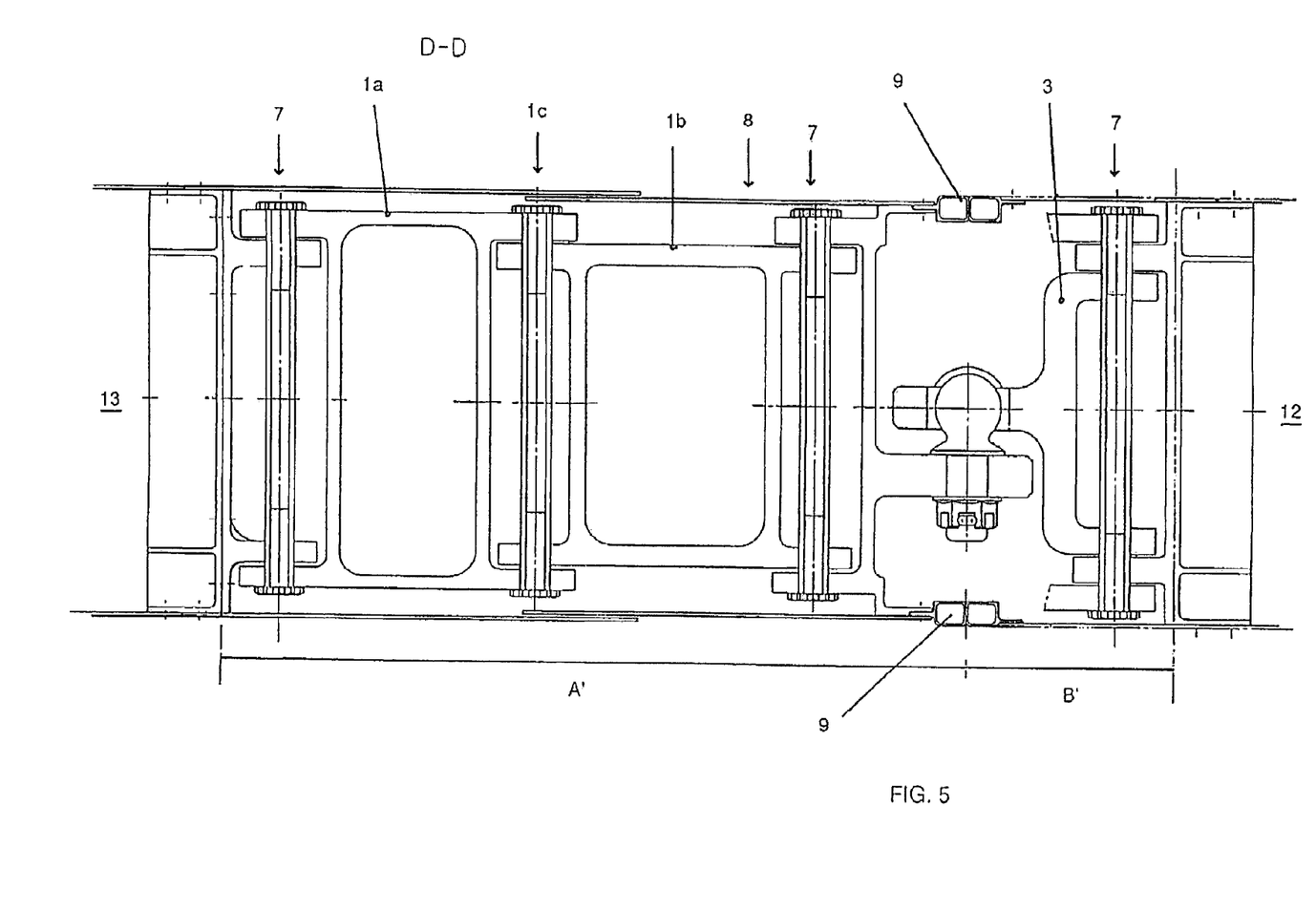
FIG. 5 shows a cross section along the line D-D of FIG. 3.

FIG. 5 shows a cross section of the second steering arm 1 and the spherical-head attachment 3 along line D-D in FIG. 3. In this Figure, too, the regions A' and B' are marked. As is the case in FIGS. 3 and 4, FIG. 5 also shows that the second steering arm 1 comprises and/or consists of a first part 1a and a second part 1b, which parts are interconnected by way of a hinged joint 1c. Furthermore, the first part 1a is coupled to the second landing flap 13 by way of a fitting 7, and the second part 1b is coupled to the compensating profile 8 by way of a fitting 7. Moreover, FIG. 5 shows the spherical-head attachment 3 which connects the compensating profile 8 to the first landing flap 12 by way of a fitting 7.

Figure 6:
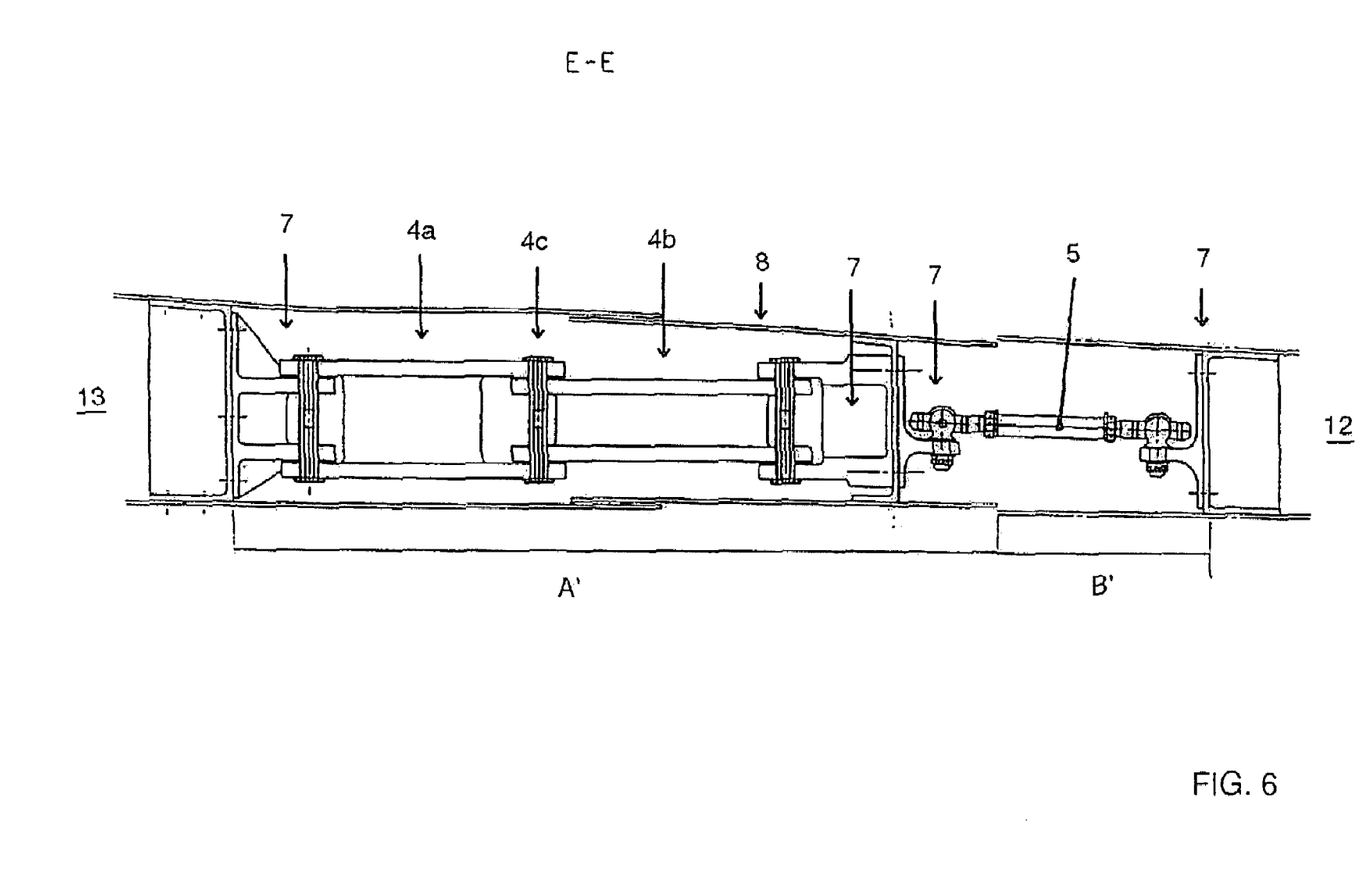
FIG. 6 shows a cross section along the line E-E of FIG. 3.

FIG. 6 shows a cross section of the first steering arm 4 as well as the steering rod 5 along line E-E of FIG. 3. In FIG. 6 again, the regions A' and B' are marked. The second steering arm 4 comprises and/or consists of a first part 4a and a second part 4b, which parts are hingeably connected by way of a hinged joint 4c. The first part 4a is again coupled to the second landing flap 13 by way of a fitting 7, and the second part 4b is coupled to the compensating profile 8 by way of a fitting 7. As is also shown in this figure, one end of the steering rod 5 is coupled to the compensating profile 8 by way of a fitting 7, and the other end of the guidance rod 5 is coupled to the first landing flap 12 by way of a fitting 7.

Figure 7:
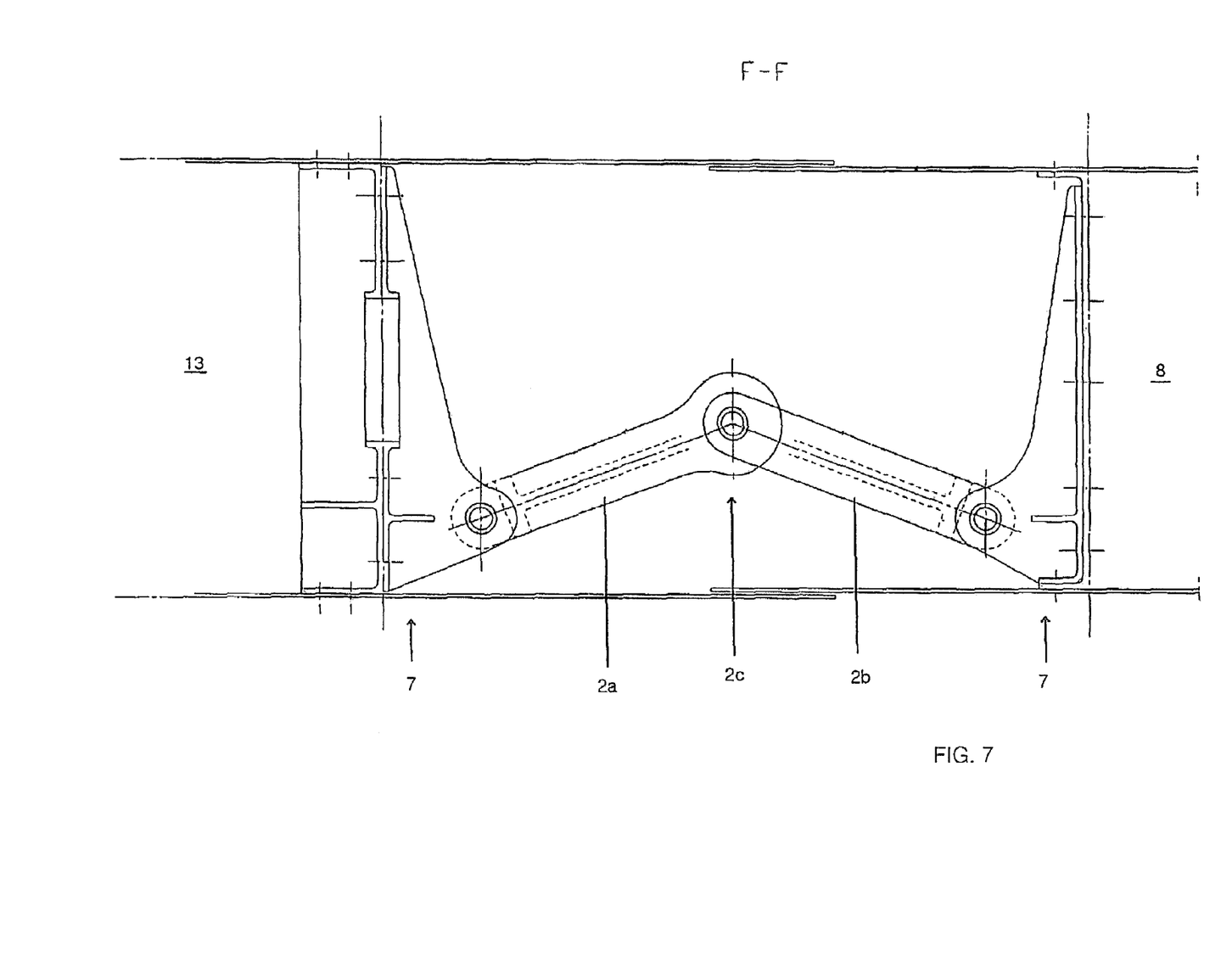
FIG. 7 shows a cross section along the line F-F of FIG. 3.

FIG. 7 shows a cross section of the guide arm 2 along line F-F of FIG. 3. As is the case in FIGS. 3 and 4, in FIG. 7 too the guide arm 2 comprises and/or consists of a first part 2a and a second part 2b, which parts are hingeably interconnected by way of a hinged joint 2c. The first part 2a is coupled to the second landing flap 13 by way of a fitting 7, and the second part 2b is coupled to the compensating profile 8 by way of a fitting 7.

Figure 8:
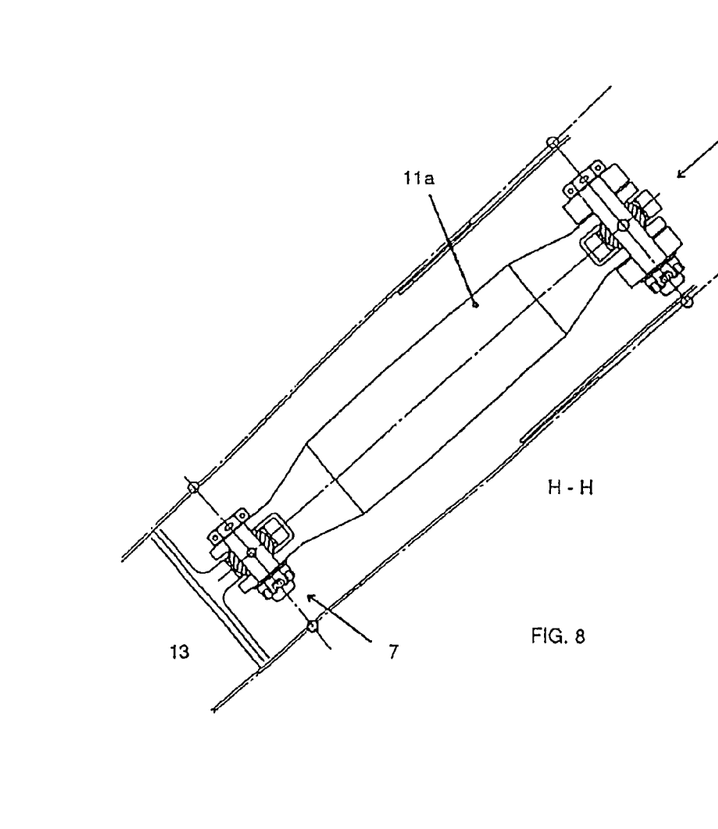
FIG. 8 shows a cross section along the line H-H of FIG. 3.
Figure 9:
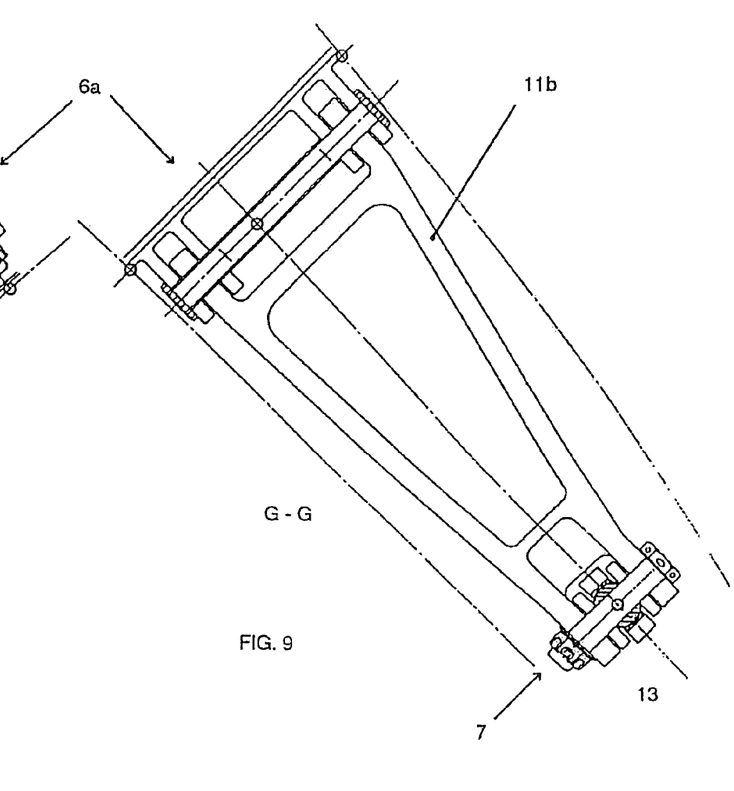
FIG. 9 shows a cross section along the line G-G of FIG. 3.

FIG. 8 shows a cross section of one of the two load introduction fittings 11a along line H-H of FIG. 3, while FIG. 9 shows a cross section of the other load introduction fitting 11b along line G-G in FIG. 3, except that it is rotated by 90 degrees on its longitudinal axis. The load introduction fittings 11a, 11b are coupled to the second landing flap 13 by way of a fitting 7 each, and are interconnected by way of a joint 6a.

Figure 10:
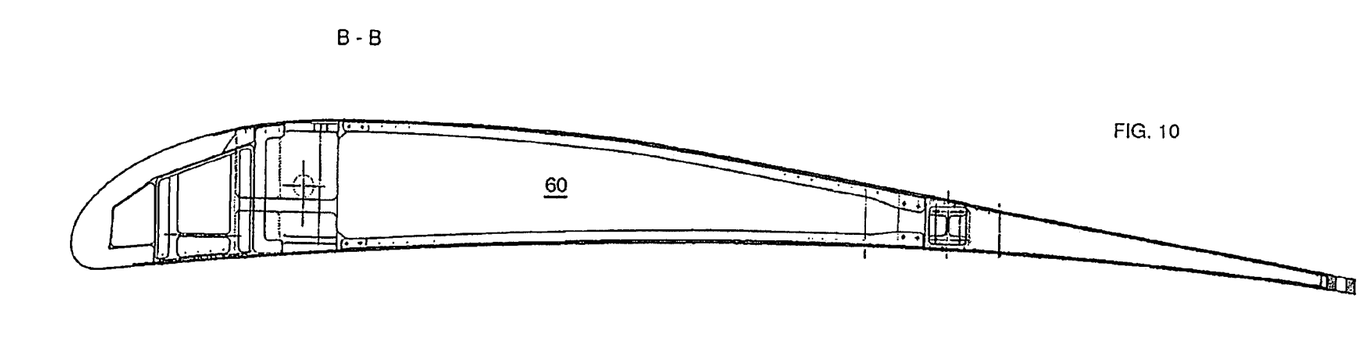
FIG. 10 shows a cross section along the line B-B of FIG. 3.

FIG. 10 shows a cross section along the compensating profile 8 corresponding to line B-B of FIG. 3. In this diagram essentially the space 60 between the landing flaps is marked, which space is available for the flap interconnection system and the associated load introduction fittings.

Figure 11:
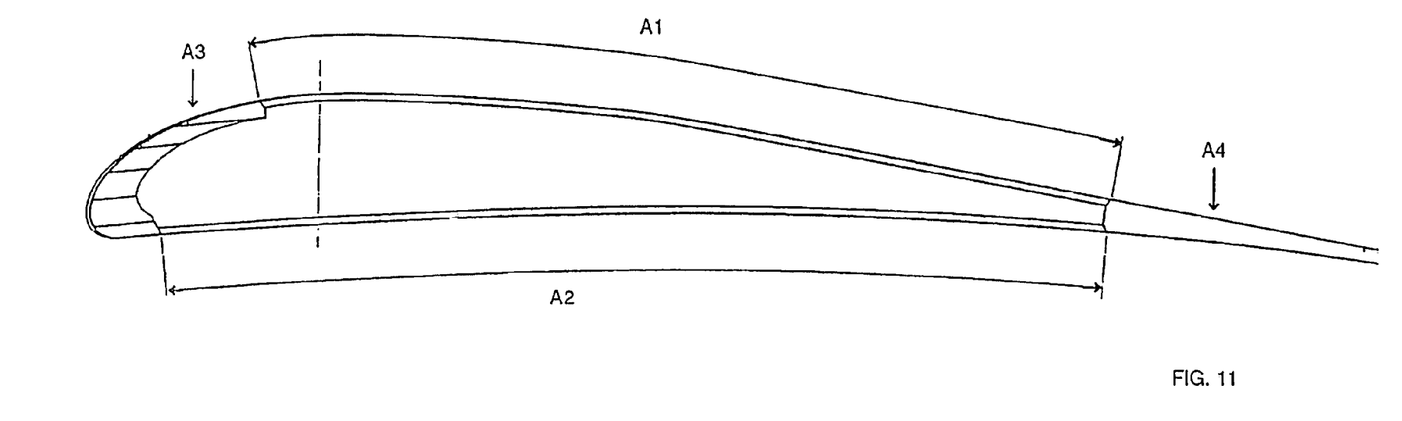
FIG. 11 shows a cross section along the sealing plane of a flap in accordance with an exemplary embodiment of the present invention.

Finally, FIG. 11 shows a cross section of a sealing plane between the two landing flaps 12, 13. The regions designated by reference signs A1 and A2 show the cover with the tubular seal as an installation opening. Furthermore, FIG. 11 shows a first sealing cushion A3 at the front, and a second sealing cushion A4 at the rear of the landing flaps. Reference characters in the claims are not to be interpreted as limitations.

What is claimed:

1. An interconnection system for flaps of an aircraft, the flaps being located side-by-side and the flaps having a gap between the flaps, the gap having a gap width and the gap width changes when the flaps are moved, the interconnection system comprising:
    a compensating profile; and
    a first coupling coupled with the compensating profile such that the compensating profile is guided on one of the flaps, wherein the compensating profile has a form of a moveable profile rib, whereby the gap between the flaps is aerodynamically closed due to the movement of the compensating profile in relation to the one of the flaps.

2. The interconnection system of claim 1, further comprising a second, longitudinally adjustable coupling of the compensating profile on the other flap.

3. The interconnection system of claim 1, wherein the first coupling comprises a spherical-head fitting in a wing-front region of the compensating profile.

4. The interconnection system of claim 1, wherein the first coupling comprises a steering rod or control rod in a wing-rear region of the compensating profile.

5. The interconnection system of claim 2, wherein the second coupling comprises a longitudinally adjustable guide arm in a wing-front region of the compensating profile.

6. The interconnection system of claim 2, wherein the second coupling comprises a first longitudinally adjustable steering arm in a wing-rear region of the compensating profile.

7. The interconnection system of claim 2, wherein the second coupling comprises a second longitudinally adjustable steering arm in a wing-front region of the compensating profile.

8. The interconnection system of claim 1, further comprising a failsafe device for adjacent flaps in the form of a longitudinally adjustable interconnection strut, which is coupled to the adjacent flaps by way of two first and two second load introduction fittings.

* * * * *